United States Patent [19]

Lidstone et al.

[11] Patent Number: 5,779,150
[45] Date of Patent: Jul. 14, 1998

[54] AIRCRAFT ENGINE EJECTOR NOZZLE

[75] Inventors: Gary L. Lidstone, Federal Way; David L. Sandquist, Renton; Larry T. Clark, Enumclaw; Imre A. Szupkay, Othello, all of Wash.

[73] Assignee: The Boeing Company, Seattle, Wash.

[21] Appl. No.: 723,589

[22] Filed: Oct. 1, 1996

[51] Int. Cl.$^6$ .................................................. B64D 33/04
[52] U.S. Cl. ............................ 239/265.13; 239/265.19; 239/265.17
[58] Field of Search ................... 239/265.13, 265.19, 239/265.23, 265.25, 265.17; 181/219, 220, 213; 60/262

[56] References Cited

U.S. PATENT DOCUMENTS

| | | | |
|---|---|---|---|
| 2,803,944 | 8/1957 | Kroon | 239/265.19 |
| 2,938,335 | 5/1960 | Cook | 239/265.13 |
| 2,997,845 | 8/1961 | Oulianoff. | |
| 3,237,864 | 3/1966 | Taylor et al. | 239/265.19 |
| 3,263,931 | 8/1966 | Bartek et al.. | |
| 3,333,772 | 8/1967 | Bruner | 239/265.13 |
| 3,372,876 | 3/1968 | Colville et al. | 239/265.13 |
| 3,409,228 | 11/1968 | Mehr. | |
| 3,524,588 | 8/1970 | Duval. | |
| 3,550,721 | 12/1970 | Bruner. | |
| 3,613,829 | 10/1971 | Cabassut. | |
| 3,637,041 | 1/1972 | Hilbig. | |
| 3,647,020 | 3/1972 | MacDonald. | |
| 3,664,455 | 5/1972 | Duvvuri. | |
| 3,695,387 | 10/1972 | Hilbig. | |
| 3,774,868 | 11/1973 | Goetz. | |
| 3,897,169 | 7/1975 | Fowler. | |
| 4,095,417 | 6/1978 | Banthin. | |
| 4,165,607 | 8/1979 | Rudolph. | |
| 4,175,640 | 11/1979 | Birch et al.. | |
| 4,215,536 | 8/1980 | Rudolph. | |
| 4,422,524 | 12/1983 | Osborn. | |
| 4,537,026 | 8/1985 | Nightingale. | |
| 4,690,329 | 9/1987 | Madden. | |
| 4,819,876 | 4/1989 | Thayer. | |
| 4,958,489 | 9/1990 | Simmons. | |
| 5,044,553 | 9/1991 | Degress | 239/265.19 |
| 5,044,559 | 9/1991 | Russell et al.. | |
| 5,343,697 | 9/1994 | Johnson et al.. | |

OTHER PUBLICATIONS

"The Jet Engine," chapters 6, 14, 15 and 19, Rolls–Royce plc, 1992.

*Primary Examiner*—Kevin Weldon
*Attorney, Agent, or Firm*—Christensen O'Connor Johnson & Kindness PLLC

[57] ABSTRACT

An aircraft ejector nozzle includes a plug assembly (26) located between upper and lower cowlings (18, 20) and upright sidewalls (22). The plug assembly (26) includes separable upper and lower diverters (28, 30). Each diverter includes multiple subsections pivotably attached end-to-end. In one embodiment, first, second, and third subsections (90, 92, 94) are provided. Stationary ejectors (40, 42) located in the cowlings (18, 20) input ambient airflow (44) into an exhaust stream (32). Preferably the ejectors (40, 42) include mixing components (46). Upper and lower aft flaps (48, 50) further tailor the exhaust path shape. An actuation assembly (52) moves the diverters (28, 30) and aft flaps (48, 50) between their various positions. One actuation assembly embodiment includes a number of rotatable disks (118, 120, 132, 134, 142) for guiding the upper and lower diverters (28, 30) and the aft flaps (48, 50). In a first plug assembly configuration the diverter forward ends (84) are positioned together and the diverter aft ends (86) are positioned together. The first configuration forces exhaust (32) around the diverters (28, 30). In a second plug assembly configuration the diverter forward ends (84) are positioned apart and the diverter aft ends (86) are positioned apart. The second configuration forces exhaust (32) between the diverters (28, 30) while simultaneously covering the ejectors (40, 42). Acoustic linings (100) are provided at various locations within the nozzle and are exposed to the exhaust flow only during noise suppression configurations, thus minimizing liner wear and contamination.

23 Claims, 5 Drawing Sheets

AIRCRAFT ENGINE EJECTOR NOZZLE

Field of the Invention

The present invention relates to ejector nozzles, and, more particularly, to mixer ejector nozzles for use in maintaining engine performance while suppressing jet noise.

BACKGROUND OF THE INVENTION

In jet engines, it is known to use ejector nozzles to entrain ambient air with engine exhaust gases. The ambient air cools the engine exhaust and improves the overall thrust and performance characteristics during flight. Known systems, such as that described in U.S. Pat. No. 3,409,228, generally include a common nozzle that extends aftward from an engine exhaust source. An ejector inlet located in a nozzle sidewall guides ambient air directly into primary exhaust via an ejector passage connecting the two fluid streams. It is also known to use a nozzle plug assembly or tail cone centrally disposed within the nozzle to control the nozzle duct interior area and shape. Using a plug assembly can greatly increase an engine's propulsive efficiency by allowing the pilot to tailor the engine thrust output and performance characteristics for a specific flight condition.

In recent years it has become important to minimize jet noise, especially during takeoff and landing flight segments. Mixer ejectors, such as "daisy" or lobed designs, provide finger-like mixing lobes at inboard locations along the ejector passage. The lobes work to actively combine ambient air with the engine exhaust. The combined airflow has a lower flow velocity than the average of the separate, uncombined flow velocities. According to current understandings in the art, this lower exhaust exit velocity results in less jet noise.

Because ejectors and mixing components are not needed for all flight conditions, it is known to include additional nozzle parts for stowing the ejectors and mixing components in various nozzle sidewall areas. These additional stowage parts disadvantageously add weight and system complexity to the nozzle. The ejectors, mixing components and associated parts can also hinder a designer's efforts to create an internal nozzle duct that has a wide range of available shapes for use in a wide range of flight conditions. This is especially problematic when designing for cruise conditions, where pronounced convergent-divergent shapes are required to maximize thrust for given cruise engine settings, mach numbers, and altitudes. Under these circumstances, a desired large duct cross-sectional size may be unattainable due to the space being occupied by an ejector, a mixer, or the various associated components.

Thus, a need exists for a superior aircraft nozzle capable of optimizing engine performance and reducing jet noise through the use of an ejector while additionally providing noise suppression. The ideal nozzle should be configured such that the ejector and mixing structures are present when needed, but not present when not needed. These structures should not interfere with, or limit, the range of available nozzle duct shapes. Preferably, the structures should not add significant additional weight or complexity to the nozzle. The structures should be able to withstand the high temperature, high velocity airflow environment for an entire flight envelope, as well as maintain integrity over the life of an engine installation. The present invention is directed to fulfilling this need.

SUMMARY OF THE INVENTION

In accordance with the present invention, an aircraft engine ejector nozzle that optimizes engine performance and suppresses engine noise by altering the nozzle exhaust duct shape is provided. This is accomplished by using a reconfigurable plug assembly positioned longitudinally within the nozzle between upright nozzle sidewalls. The plug assembly includes separable upper and lower diverters. Each diverter includes an inner surface, an outer surface, a forward end, and an aft end. The upper and lower diverter inner surfaces are positioned in an opposed relation.

Upper and lower nozzle cowlings are located above and below the plug assembly respectively. The cowlings extend between and structurally support the sidewalls. At least one, and preferably both, of the upper and lower cowlings includes an ejector for directing ambient air into the nozzle and exhaust airflow. One or more mixing components are optionally included in the ejector or other nozzle structures for encouraging the mixing of the ambient flow with engine exhaust. In one embodiment of the invention, the ejectors are lobed mixer ejectors. Preferably, the ejectors and mixing components are stationary in order to simplify the nozzle design and reduce the number of nozzle components.

The reconfigurable plug assembly has at least two distinct configurations. In the first configuration or suppressed mode, both the diverter forward ends and the diverter aft ends are positioned together. This forms a bifurcated exhaust path defined between the cowlings and the diverter outer surfaces. In the second configuration or non-suppressed mode, both the diverter forward ends and the diverter aft ends are positioned apart to form a single exhaust path defined by the upper and lower diverter inner surfaces. In the second configuration, the upper and lower diverter forward ends are adjacent the upper and lower cowling inner surfaces respectively. This prevents the ejector outputs from mixing with the engine exhaust airflow and removes the ejector components from the harsh engine exhaust airflow.

In accordance with further aspects of the invention, each diverter capable of assuming convex and concave shapes. Preferably, the diverters are formed of multiple subsections pivotably attached end-to-end about axes extending between the upright sidewalls. The forward end of the forwardmost subsection forms the upper diverter forward end, and the aft end of the aftmost subsection forms the upper diverter aft end. In one embodiment, the upper and lower diverters each include first, second, and third subsections.

In accordance with other aspects of the invention, the nozzle further includes upper and lower aft flaps that each have a forward end and an aft end. The flap forward ends are pivotable about axes of rotation transverse to the upright sidewalls at locations downstream of the cowling ejectors.

In accordance with still further aspects of the invention, an actuation assembly moves the plug assembly between its various configurations. One embodiment of a suitable actuation assembly includes a number of rotatable disks connect to the lateral side surfaces of the upper and lower diverters and aft flaps via an arrangement of rotating shafts, guide pins, and pin tracks. The disks are positioned at the upright sidewalls in a generally coplanar relation and are rotated using any of a number of available techniques, e.g., linear or rotary actuators. The actuation assembly moves the diverter forward and aft ends between joined and separated positions.

In accordance with still other aspects of the invention, the nozzle components are formed of heat and corrosion resistant materials, such as a nickel-based super alloy. Acoustic linings may be attached to various nozzle components and are especially recommended when mixing components are included in the ejectors.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
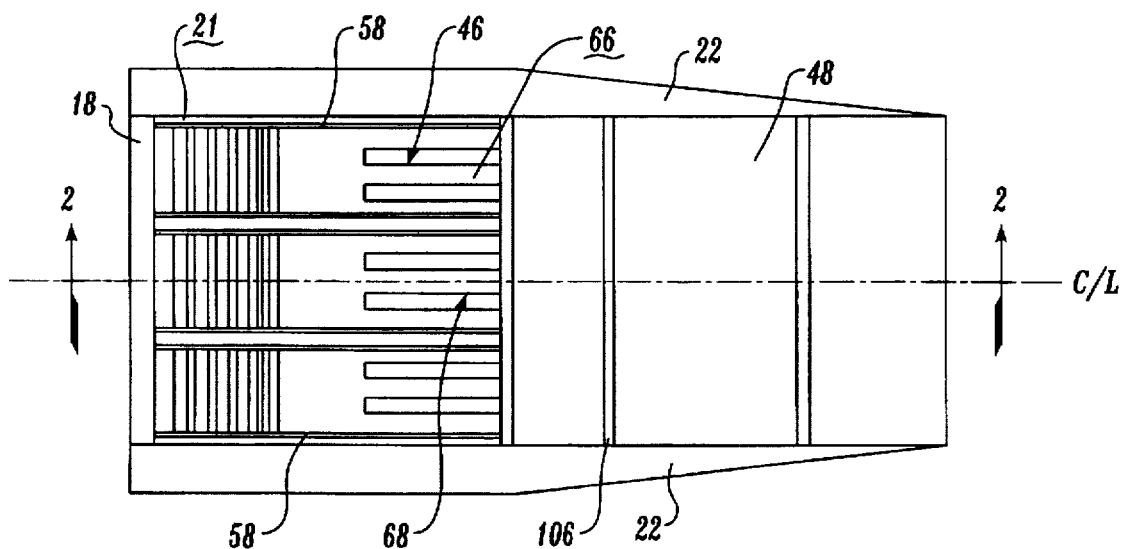
FIG. 1 is a top plan view of an ejector nozzle formed in accordance with the present invention as arranged in a first configuration for providing noise suppression during a low power setting.

The ejector nozzle of the present invention is described herein with relation to a turbofan or turbojet engine in which the nozzle entrains and mixes ambient air with engine exhaust. These limitations are provided for illustrative purposes only. With suitable changes, the present invention can be practiced in other types of engines requiring the mixing of any two airflows, e.g., tertiary air with primary exhaust or a mixed flow.

In general, the present invention ejector nozzle includes an upper cowling 18, a lower cowling 20, and opposed upright sidewalls 22 that together form an internal nozzle exhaust path. A plug assembly 26 having separable upper and lower diverters 28, 30 directs engine exhaust 32 in either a bifurcated path 34 formed around the diverters, or a single path 36 formed between the diverters. When the diverters 28, 30 direct exhaust airflow 32 around themselves, stationary upper and lower ejectors 40, 42 are available to entrain ambient air 44 into the exhaust stream in order to maintain engine performance while reducing the jet velocity. Mixing components 46 are incorporated into the ejectors 40, 42 to enhance mixing of the two flows and increase noise frequency to ranges amenable for acoustic treatment. When the diverters 28, 30 direct exhaust airflow 32 between themselves, the ejectors 40, 42 and mixing components 46 are conveniently covered. The diverters 28, 30 form a convergent-divergent exhaust path shape that improves the nozzle performance. Upper and lower aft flaps 48, 50 may be additionally included to further tailor the exhaust path shape. An actuation assembly 52 moves the diverters 28, 30 and aft flaps 48, 50 between their various positions.

Figure 2:
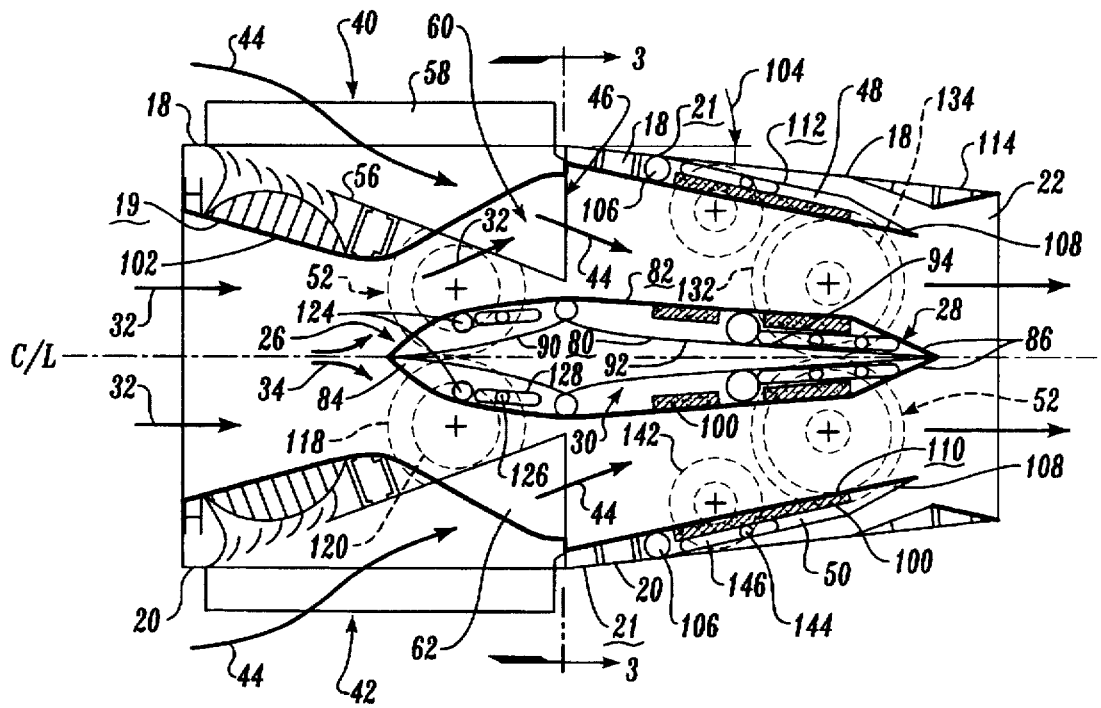
FIG. 2 is a cross-sectional view along line 2—2 of FIG. 1.
Figure 3:
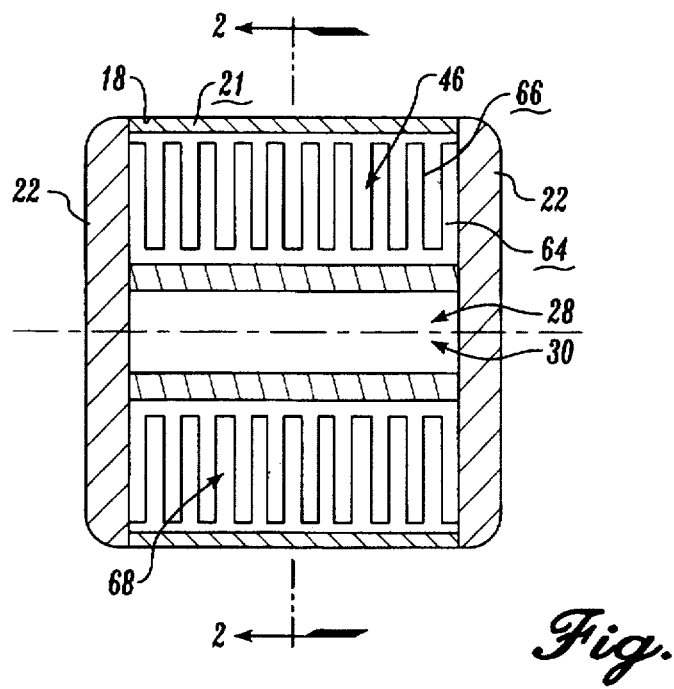
FIG. 3 is a cross-sectional view along line 3—3 of FIG. 2.

In detail, referring to FIGS. 1–3, the present invention ejector nozzle exhaust path or duct is defined by the inner surfaces 19 of the upper and lower cowlings 18, 20 and the opposed upright sidewalls 22. The exhaust path begins at the nozzle forward end near the source of the engine exhaust. The exhaust path terminates by opening to the atmosphere at the nozzle aft end. This allows all exhaust gases to finally exit the entire propulsion installation.

Structurally, the nozzle forward end is attached to, or integrally formed with, an exit area of the engine casing or other appropriate installation structure. As is known in the art, various struts and support beams are used in the sidewalls, casings, and cowlings to support the nozzle weight and dynamic loads. These structures are modified appropriately to support the nozzle of the present invention. The sidewalls 22 and cowlings 18, 20, and their inner surfaces in particular, should be formed of heat and corrosion tolerant materials, e.g., nickel-based super alloys. The nozzle is typically circular in cross-sectional shape at its forward end, but quickly transitions to a rectangular cross-sectional shape in its remaining locals. The sidewall inner surfaces downstream of the nozzle forward end are generally smooth and linear. The cowling inner surfaces 19 are also smooth, though of varying longitudinal shapes.

Referring to FIG. 2, an ejector is formed in at least one of the upper and lower cowlings 18, 20. As used herein, the word "ejector" refers to the combination of components provided to entrain ambient air into the engine exhaust. For most commercial aircraft, it is recommended to include at least one ejector 40, 42 in each cowling 18, 20. There are many types of conventional ejectors that can be used with the present invention. The preferred ejector includes an angled passage 56 extending inward from a location at the outermost surface of its respective cowling and terminating within a divergent flow region of the exhaust path. The ejector passage walls may be formed from dedicated structures extending from a cowling; or, as shown in FIGS. 1–9, may be created by forming the passage 56 in a cowling that has a relatively thick cross-sectional shape. In either case, the preferred passage 56 should have sufficient length to actually guide ambient air 44 into the engine exhaust 32, as opposed to merely allowing ambient air 44 to enter the exhaust path unguided. The dimensions of the ejectors 40, 42 will depend in part on the space available and the amount of ambient airflow required, as well as other factors known to those skilled in the art.

During engine use, the static pressure inside the nozzle is less than the static pressure of the ambient airflow. This creates a natural tendency for ambient air 44 to be drawn into the ejector passage 56. To open and close the ejectors to ambient air input, one or more doors 58 are rotatably attached to the cowling at an outer surface location near the start of the ejector passage 56. Preferably, each door 58 is rectangular in shape with an axis of rotation along a longitudinal side that lies parallel to the longitudinal axis of the ejector nozzle. As a result, the doors 58 open parallel to the ambient airflow and assume an upright position relative to the cowling. Shown in FIG. 1 are three doors positioned laterally side-by-side. Various seals can be used to further tailor the input or exclusion of ambient air 44 into the nozzle. The doors 58 are actuated by use of any one of a number of known methods, e.g., linear or rotary actuators.

To reduce jet noise, each ejector 40, 42 includes one or more mixing components 46. By way of example, lobed ejectors 60 are shown as the mixing components in FIGS. 1–9. Each lobed ejector 60 includes an inboard section 62 (indicated in FIG. 2) having continuous inner and outer surfaces 64, 66 (indicated in FIG. 3)) that form into a plurality of vertically-oriented, finger-like lobes 68. A constant cross-sectional thickness is maintained roughly throughout the material of the inboard section 62, which allows airflow on either side of the section to encounter lobed passages, although in alternating fashion. The lobes 68 of FIGS. 1–9 start at roughly half the longitudinal distance along the ejector passage 56 and extend past the cowling inner surface 19 and into the exhaust path.

Still referring to FIG. 2, the thicker line at the inboard section 62 represents the exhaust duct wall as seen by the engine exhaust airstream 32. This wall is actually formed by the peak regions of the inboard section inner surface 64. The peak regions alternate laterally with trough regions in the inboard section. The inboard section outer surface 66 at the trough regions forms the lobe passages utilized by the ambient air input 44. At the inboard section exit plane, vertical "slices" of ambient air 44 alternate with vertical "slices" of engine exhaust 32. This provides a generous amount of sheering surface between the airflows, thus improving the opportunities for mixing. As stated above, with appropriate modifications, any one of a number of available ejectors and mixing components may be adapted for use in the present invention nozzle. The description of the lobed ejector 60 is therefore meant to be illustrative and not limiting. Likewise, for installations not requiring noise suppression, the mixing components 46 may be omitted.

Preferably, ejectors 40, 42 and mixing components 46 are stationary so as to avoid the need for parts normally associated with moving these components between operative and inoperative states. A reduction in parts desirably reduces engine weight and nozzle complexity. According to the present invention, the actions of the stationary ejectors and mixing components are easily eliminated when not required, by reconfiguring the plug assembly 26 to cover or "hide" the ejectors 40, 42 and mixing components 46 from the engine airflow. This aspect of the invention is discussed in detail below.

The plug assembly 26 is reconfigurable by means of the separable upper and lower diverters 28, 30 and the actuation assembly 52. Referring to FIG. 2, the diverters 28, 30 each include an inner surface 80, an outer surface 82, a forward end 84, and an aft end 86. The forward and aft ends 84, 86 are each tapered to form an aerodynamic edge. The diverters 28, 30 extend normally between the nozzle sidewalls 22, with their forward ends 84 being located upstream of the ejectors 40, 42 and their aft ends 86 being located downstream of the ejectors 40, 42 and preferably near the nozzle aft end.

Although substantially rigid, the diverters 28, 30 should be capable of assuming different arcuate shapes. In particular, the diverters must be able to assume both convex and concave shapes when viewed in a longitudinal-vertical plane. Shown in FIGS. 2 and 4, the diverters 28, 30 are curved inward, i.e., a convex shape. Shown in FIGS. 6 and 8, the diverters 28, 30 are curved outward, i.e., a concave shape. Such curvature variations can be realized in various ways, depending in part on the method of actuation to be used. A preferred arrangement is to form each diverter from a series of interlinked subsections rotatably joined end-to-end and connected at their sides to actuation components embedded in the sidewalls 22.

One preferred diverter embodiment is illustrated in FIGS. 2, 4, 6, and 8. In this embodiment each diverter includes first, second, and third subsections 90, 92, 94 pivotably attached end-to-end about axes of rotation oriented transverse to the upright sidewalls 22. The forward end of the first subsection 90 forms the diverter forward end 84. The aft end of the third subsection 94 forms the diverter aft end 86. The subsections 90, 92, 94 are roughly the same size in thickness and length, and extend substantially the entire lateral distance between the sidewalls 22. The precise dimensional values will depend upon various factors, e.g., the pressure bending loads of a particular application. These subsections 90, 92, 94 allow each diverter to form the necessary concave and convex shapes. Other diverter embodiments capable of providing the same basic shapes may be used, if desired.

Figure 4:
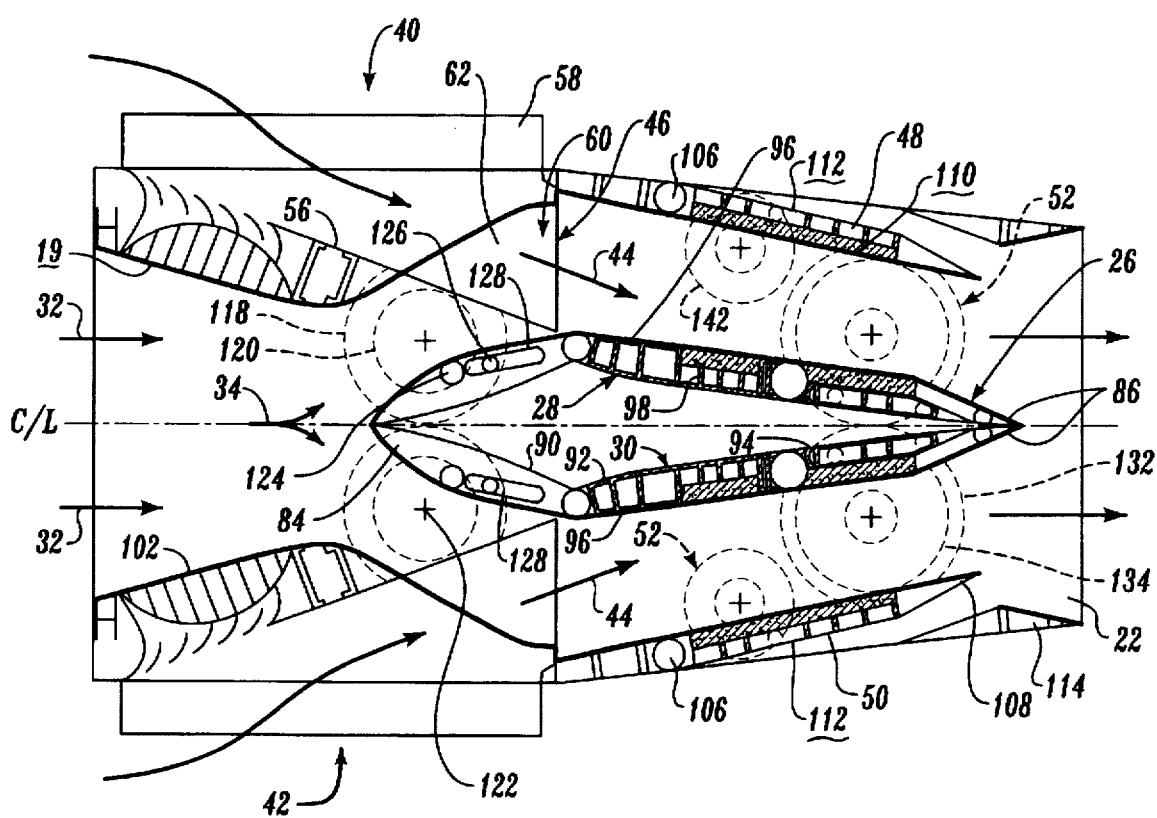
FIG. 4 is a cross-sectional view of the ejector nozzle of FIG. 1 as arranged in a first configuration for providing noise suppression during a high power setting.

The diverters 28, 30 of FIGS. 2, 4, 6 and 8 are most easily formed by attaching an outer skin 96 to a number of interconnected structural beams 98, as shown in FIG. 4. The plug assembly 26 optionally has acoustic lining 100 attached to, or preferably embedded in, the upper and lower diverter outer surfaces 82. Acoustic linings are particularly recommended for diverter outer surfaces 82 located aft of mixing components 46, since mixing components themselves tend to generate noise.

The plug assembly 26 has at least two basic configurations. In the first configuration or suppressed mode, shown in FIGS. 2 and 4, the diverter forward ends 84 are located adjacent to one another, and the diverter aft ends 86 are located adjacent to one another. The middle regions (i.e., the second subsections 92 in the one embodiment of a plug assembly described above) are in a spaced-apart relation. Exhaust airflow 32 is diverted around the diverter outer surfaces 82 and into the bifurcated paths 34. One subpath of the bifurcation is formed between the upper diverter outer surface 82 and the upper cowling inner surface 19 (and any present ejectors and/or mixing components therein). The other subpath of the bifurcation is formed between the lower diverter outer surface 82 and the lower cowling inner surface 19 (and any present ejectors and/or mixing components therein).

The precise shape of the plug assembly 26 and the cowling inner surfaces 19 will depend on the desired longitudinal shape of these subpaths. Depending on flight conditions, the preferred first configuration can be adjusted to form a throat in both the subpaths at a location just past the diverter forward ends 84. Different adjustments are shown in FIGS. 2 and 4. The shape of the subpath will also depend upon the ejectors 40, 42 and/or mixing components 46 used. As shown in FIGS. 2 and 4, ambient air 44 flows through the ejectors 40, 42 and into the respective subpath to join the engine exhaust 32, the point of entry being preferably located in a divergent region of the subpath.

Figure 6:
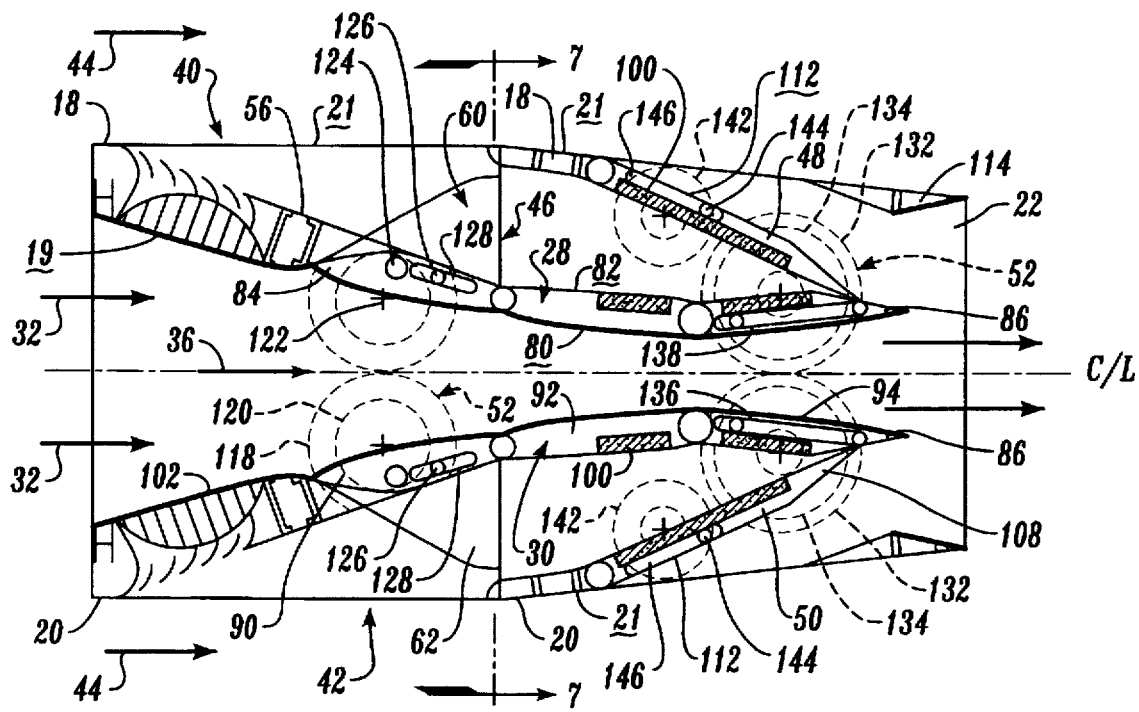
FIG. 6 is a cross-sectional view along line 6—6 of FIG. 5.
Figure 8:
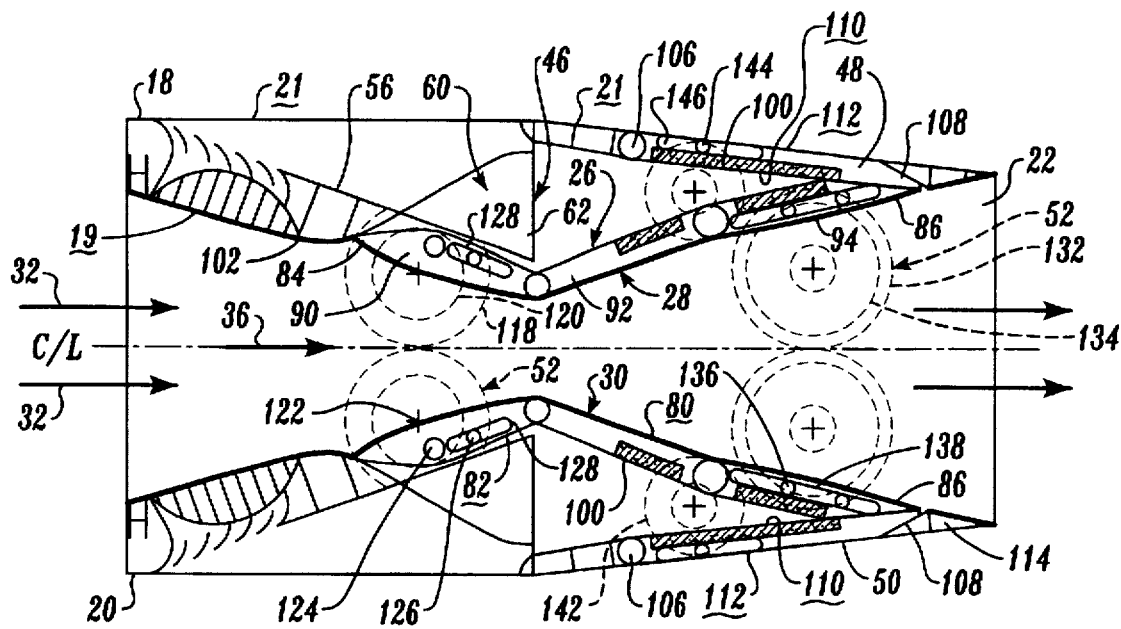
FIG. 8 is a cross-sectional view of the ejector nozzle of FIG. 1 as arranged in a second configuration non-suppressed mode during a high power setting.

In the second configuration or non-suppressed mode shown in FIGS. 6 and 8, the diverter forward ends 84 are separated from each other, as are the diverter aft ends 86. The middle regions of the diverters continue in a spaced-apart relation. The ejector doors 58 are closed to prohibit ambient air 44 from flowing into the ejectors 40, 42. An important aspect of the non-suppressed mode is the ability to position the diverter forward ends 84 next to the cowling inner surface 19 at a position upstream of the ejectors 40, 42 and mixing components 46. This upstream cowling inner surface is located generally at the position labeled 102 in FIGS. 6 and 8. Therefore, it is advantageous to initially converge the cowling inner surfaces 19 in order to decrease the degree of rotation and the longitudinal length required of the first subsection 90 in order to contact the cowlings 18, 20 at the upstream location 102. This effectively closes off the subpaths of the first configuration. The engine exhaust 32 thus enters the nozzle and is directed along a single convergent-divergent duct formed between the diverter inner surfaces 80.

The precise shape assumed by the diverters 28, 30 will depend on the desired longitudinal shape of the single exhaust path. Different shapes are shown in FIGS. 6 and 8. The preferred second configuration shape is generally a convergent-divergent shape having a single throat located along the diverter inner surfaces 80. The strictness of the convergence and divergence will depend on the thrust characteristics desired. As will be recognized from viewing FIG. 6 and 8. when the plug assembly 26 is in its second configuration, the ejectors 40, 42 and mixing components 46 are advantageously entirely covered from the high-velocity exhaust airflow 32. The plug assembly 26 second configuration is therefore most useful during flight segments not requiring ambient air input or mixing, since the ejectors 40, 42 and mixing components 46 are eliminated from the exhaust path. As may be noted, the non-suppressed mode advantageously also covers any acoustic linings 100 present in the plug assembly diverter outer surfaces 82, thus protecting them from the engine exhaust.

Downstream of the ejectors 40, 42, each cowling continues in a roughly horizontal manner. The nozzle may further include upper and lower aft flaps 48, 50 formed in the upper and lower cowlings 18, 20, respectively. The aft flaps 48, 50 each have a forward end 106 and a tapered aft end 108. The forward ends 106 are rotatable about a axis of rotation extending normally between the nozzle sidewalls 22. The aft flaps 48, 50 should be formed of rigid, temperature and corrosion resistant materials. It is recommended for the aft flaps 48, 50 to also include a plurality of acoustic liners 100 formed along the aft flap inner surfaces 110. As discussed above, acoustic linings 100 can help reduce any noise caused by the engine flow 32 mixing with the entrained ambient flow 44.

The aft flaps 48, 50 rotate between outboard and inboard states. In the outboard state shown in FIG. 8, the flap outer surface 112 is flush with the adjacent cowling outer surface 21. The flap inner surface 110 forms a portion of the cowling inner surface and is also flush with the remaining, adjacent cowling inner surfaces. The flap aft ends 108 may form the rear of the nozzle, or as shown in FIG. 2, a connecting member or support brace 114 may be extended between the sidewalls 22 behind each flap 48, 50. The connecting members 114 provide support for the upright sidewalls and are especially recommended when using particularly thin sidewalls to reduce sidewall deflection. The connecting member cross-sectional shape should be as aerodynamically uninterrupting as possible, while still providing the necessary support. In the inboard state shown in FIGS. 2, 4, and 6, each flap 48, 50 is rotated inward. In some configurations the flap aft ends 108 are positioned to contact the diverter aft ends 86.

The actuation assembly 52 may be formed using any of a number of conventional techniques. One actuation assembly embodiment utilizes the known technique of coaxial rotating disks or annuluses. These disks are positioned at, or in, both upright sidewalls 22 in a generally coplanar arrangement. The disks connect to various locations along the lateral sides of the upper and lower diverters 28, 30 with sliding pin joints. In order to shield the disks from direct exposure to the exhaust gases 32 in the duct, it is preferred to at least partially embed the disks in the sidewall 22 and possibly provide a heat shield if necessary. The disks are connected to the sidewalls 22 in a manner to allow only rotational movement about their axes.

As applied to the diverter embodiment shown in FIGS. 2, 4, and 6, at the location of the diverter first subsection 90, there are outer and inner coaxial forward disks 118, 120 rotatable about an axis 122. The outer forward disk 118 has a larger diameter than the inner disk 120. The inner forward disk 120 includes a shaft 124 fixed to the disk 120. The shaft 124 extends inward from the inner disk 120 to rotatably engage the first subsection 90 along a lateral side surface. When the inner forward disk 120 is rotated, the shaft 124 is rotated accordingly, which causes the first subsection 90 to move in a similar manner. In order to control the angular orientation of the first subsection 90, the outer forward disk 118 includes a sliding guide pin 126 which extends inward from the outer disk 118 to engage a track 128 formed in a side surface of the first subsection 90. The track 128 is located aft of the rotatable shaft 124 connection. The sliding guide pin 126 is free to translate within the track 128. By carefully defining the shape and location of the track 128, as well as the position of the disks 118, 120, the range of angular orientations available to the first subsection 90 can be controlled, and the resulting loadings transmitted to the forward disks can be minimized.

Still referring to FIGS. 2, 4, and 6, this embodiment also has a similar disk arrangement for each diverter third subsection 94, except there is no fixed connection point to a shaft as there is in the first diverter subsection 90. Instead, two aft coaxial rotatable disks 132, 134 of varying diameters each include a guide pin 136 engaged in a single track 138 formed along the third subsection side surface. See FIGS. 6 and 8. Both guide pins 136 are free to translate within the track 138. Since the second subsection 92 is rotatably connected to both the first and third subsections 90, 94, the entire diverter is statically determinate, allowing the overall plug assembly shape to be easily manipulated into a desired contour. The aft flaps 48, 50 each are rotated in a similar manner by use of an aft flap disk 142 having a guide pin 144 for engaging a flap track 146 formed in an aft flap side surface. The track is located behind the flap's rotatable forward end 106.

The actuation of the disks may be carried out by conventional methods, e.g., linear or rotary actuators. A control system may be utilized to coordinate the rotations between disks and hence the resulting movements of the upper and lower diverters 28, 30 and flaps 48, 50.

The above described embodiment of an actuation assembly 52 is a preferred configuration, but not the only configuration encompassed by the present invention. In particular, a designer may use any appropriate available method capable of moving the diverters 28, 30 between their first and second configurations and all positions therebetween, e.g., via use of a number of actuators connected directly to the diverters.

During flight operations, the plug assembly 26 and aft flaps 48, 50 are moved between their available configurations to form the most efficient exhaust path arrangement given the engine and flight conditions. In particular, referring to FIGS. 1–3, the present invention ejector nozzle is configured for providing noise suppression during a low power setting (i.e., a larger nozzle throat). The most important aspects of this mode include having plug assembly 26 positioned in its basic first configuration, the doors 58 opened to allow ambient air 44 to enter the engine exhaust stream 32, and the aft flaps 48, 50 angled to provide correct engine matching. The plug assembly 26 is further refined by increasing the bifurcated duct width at the mixing plane to its greatest possible size. Stated differently, the upper and lower diverters 28, 30 are positioned to minimize the space therebetween. This causes the bifurcated exhaust paths 34 to converge quickly at the diverter forward end 84, forming a throat between the ejector mixing component and a diverter subsection outer surface. The benefits of this arrangement include having the greatest amount of ambient air injected and mixed in the fastest region of exhaust airflow 32, i.e., the region where ejector pumping is most effective.

The nozzle throat area can be controlled to efficiently match the engine flight condition. Referring to FIG. 4, the present invention ejector nozzle is configured for providing noise suppression during a high power setting (i.e., smaller nozzle throat). This mode of operation is similar to the low power mode except the width of the bifurcated ducts 34 is reduced, i.e., the space between the upper and lower diverters 28, 30 is increased. This causes the bifurcated exhaust paths 34 to diverge more rapidly. The benefits for this configuration are being able to maintain the noise suppression mode during specific throat area engine cycle conditions, such as those which may occur during takeoff.

Figure 5:
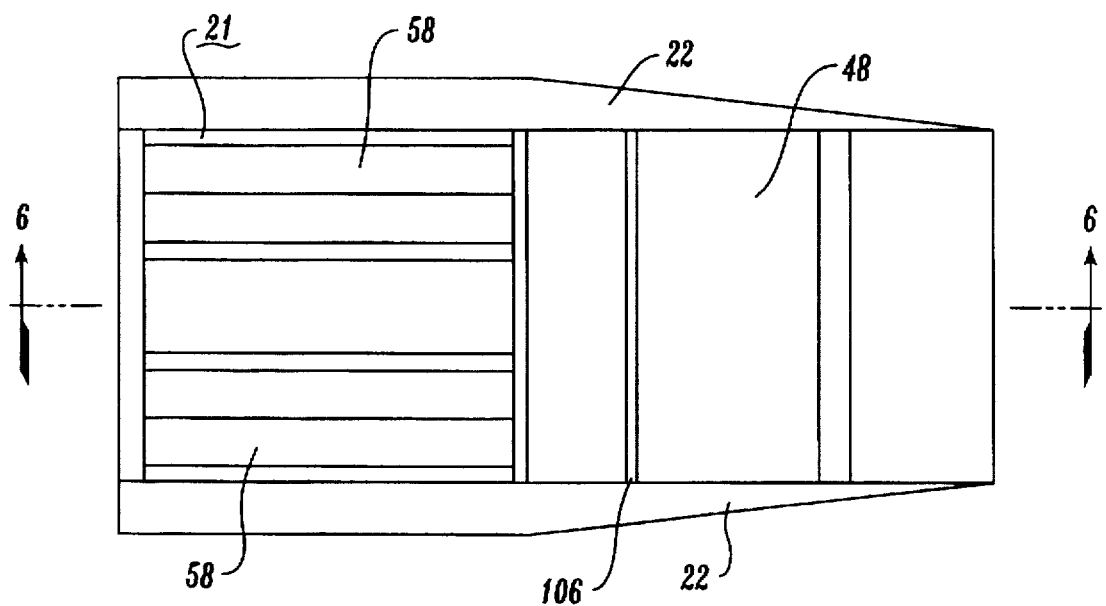
FIG. 5 is a top plan view of the ejector nozzle of FIG. 1 as arranged in a second configuration non-suppressed mode during a low power setting.
Figure 7:
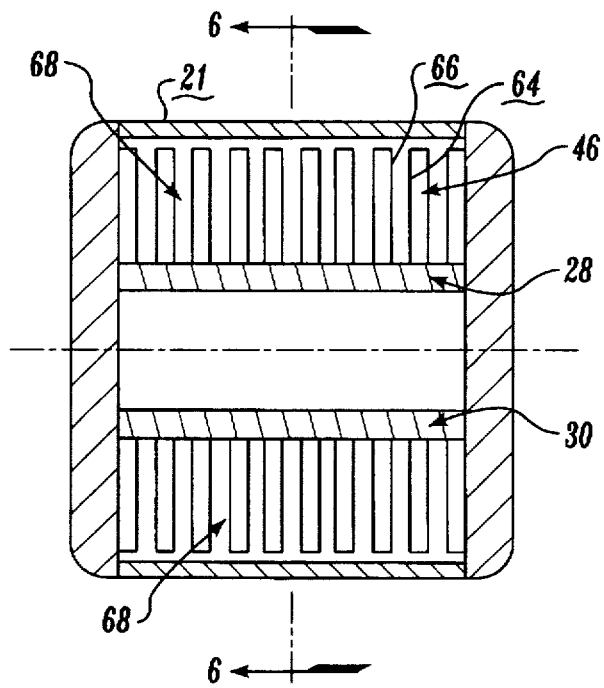
FIG. 7 is a cross-sectional view along line 7—7 of FIG. 6.

Referring to FIGS. 5-7, the present invention ejector nozzle is configured for subsonic and transonic cruise flight. Noise suppression is not typically required during these flight conditions. Therefore, the plug assembly 26 is moved to its second, non-suppressed configuration, the outer doors 58 are closed, and the aft flaps 48, 50 are rotated fully inward to their outboard state. This causes the flap aft ends 108 to connect with their respective diverter aft ends 86, thereby further precluding any ambient airflow 44 through the ejectors 40, 42. The second configuration forms a single, slowly converging-diverging exhaust path 32. The throat exists preferably about two thirds the longitudinal distance along the plug assembly 26, i.e., in the one embodiment shown in FIGS. 5-7, near the rotatable connection of the second and third diverter subsections 92, 94.

This allows for a relatively short divergent zone with a low area ratio, especially relative to the length of the convergent zone. This arrangement provides the most efficient nozzle for subsonic speeds.

Referring to FIG. 8, the present invention ejector nozzle is configured in a supersonic cruise mode. Noise suppression is not required here either. The plug assembly 26 is positioned similar to its position in the subsonic cruise mode, except the convergent zone is shortened and the divergent zone is lengthened. The throat is located preferably about one third of the way along the plug assembly 26, i.e., in the one embodiment shown in FIG. 8, at the rotatable connection of the diverter first and second subsections 90, 92. A longer divergent region allows for efficient increased expansion of the engine exhaust and increases thrust for supersonic flight conditions.

During reverse thrust, the exhaust gases 32 are preferably diverted out of the engine prior to reaching the ejector nozzle. The advantages of doing so include less weight required to support thrust reverser components from the engine strut attachments and less space required for their presence. Because the exhaust 32 should be diverted prior to reaching the ejector nozzle, the precise configuration of the plug assembly 26 and aft flaps 48, 50 is not of significance during reverse thrust.

Figure 9:
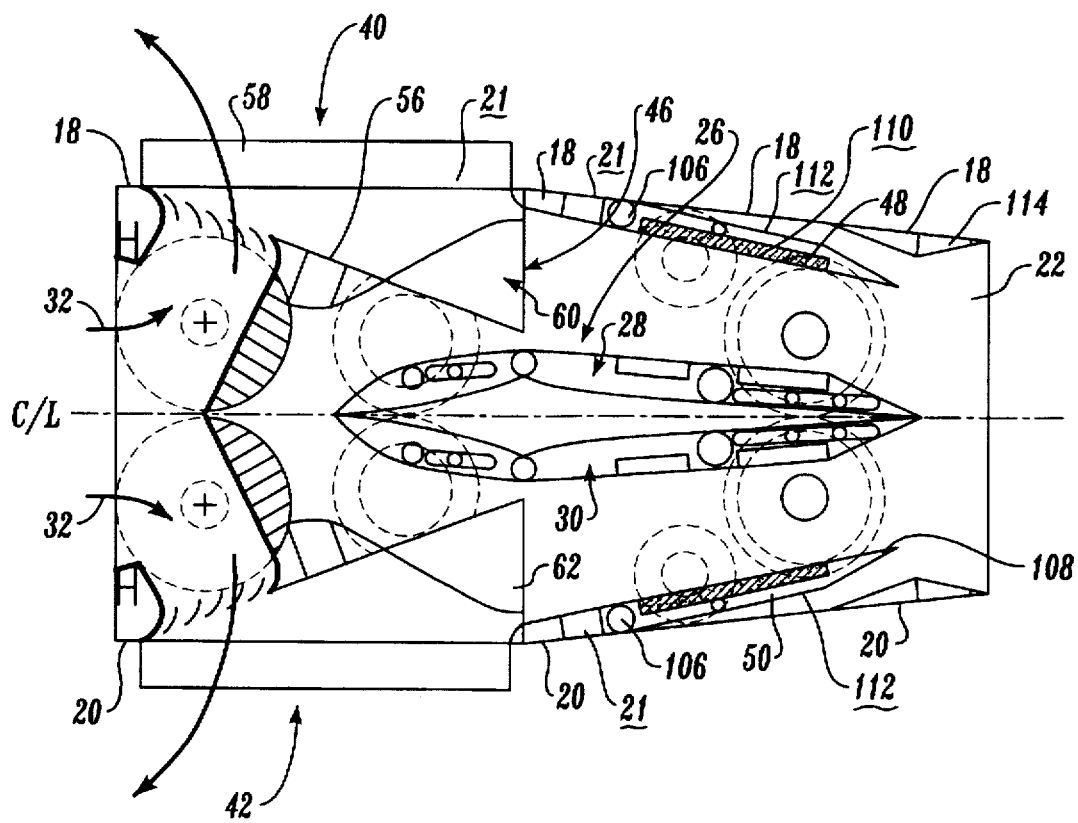
FIG. 9 is a side view of the ejector nozzle of FIG. 1 as arranged for use during reverser thrust.

Referring to FIG. 9, the lobed ejector 60 used herein to illustrate mixing components, however, has an exterior starting location in the cowling at which the thrust reverser components exhaust air out of the nozzle. For this particular configuration, it is necessary to open the ejector doors 58 to exit the reversed fluids from the engine. The plug assembly 26 is therefore preferably moved to its first configuration and the flaps 48, 50 are spaced away from the plug assembly 26. Any ambient air 44 entering the doors 58 will then pass through the nozzle without resistance. The outer doors 58 described herein may alternatively be formed of two distinct subdoors, wherein the subdoor covering the thrust reverser outlet passage can open independently of the subdoor covering the remaining inlet to the ejector passage 56.

While the presently preferred embodiment of the invention has been illustrated and described, it will be appreciated that various changes can be made therein without departing from the spirit and scope of the invention. In particular, there are a number of ejector designs which may be used with the present invention. For example, it is possible to use an translatable outer door that normally covers the inlet to the ejector passage, but translates aftward in its entirety in order to allow ambient air to enter the ejector passage. Likewise, there are a number of mixing components and mixing arrangements which could be substituted for the lobed ejector 60 described above.

The embodiments of the invention in which an exclusive property or privilege is claimed are defined as follows:

1. An aircraft engine ejector nozzle for optimizing engine performance and suppressing engine noise by altering an exhaust airflow, the nozzle comprising:
   (a) upper and lower cowlings extending between an upright sidewalls, at least one of the upper and lower cowlings including an ejector for directing ambient air into the exhaust airflow; and
   (b) a reconfigurable plug assembly extending between the upright nozzle sidewalls, the upper and lower cowlings located above and below the plug assembly respectively, the plug assembly comprising separable upper and lower diverters each having an inner surface, an outer surface, a forward end, and an aft end, the upper and lower diverters being positioned in a generally opposed longitudinal relation, the reconfigurable plug assembly having at least two distinct configurations, the first configuration comprising positioning the diverter forward ends together and the diverter aft ends together in order to form a bifurcated exhaust path defined between the cowlings and the diverter outer surfaces and the second configuration comprising positioning the diverter forward ends apart and the diverter aft ends apart to form an exhaust path defined by the upper and lower diverter inner surfaces;
   (c) an actuation assembly for moving the plug assembly between the at least two distinct configurations.

2. The nozzle according to claim 1, wherein the ejector includes at least one mixing component.

3. The nozzle according to claim 1, wherein the plug assembly second configuration includes positioning the upper and lower diverter forward ends adjacent the upper and lower cowling inner surfaces respectively.

4. The nozzle according to claim 1, wherein both the upper and lower cowlings include an ejector.

5. The nozzle according to claim 4, wherein each ejector is a lobed mixer ejector.

6. The nozzle according to claim 4, wherein the upper and lower ejectors are stationary.

7. The nozzle according to claim 4, wherein the plug assembly second configuration includes positioning the upper and lower diverter forward ends adjacent the upper and lower cowling inner surfaces respectively.

8. The nozzle according to claim 4, further including upper and lower aft flaps each having a forward end and an aft end, the upper and lower aft flap forward ends being pivotable about axes of rotation transverse to the upright sidewalls at locations aft of the upper and lower cowling ejectors respectively.

9. The nozzle according to claim 8, further including a plurality of acoustic liners attached to inboard upper and lower aft flaps surfaces.

10. The nozzle according to claim 1, wherein the actuation assembly includes forward rotatable disks for guiding the upper and lower diverter forward ends between joined and spaced apart locations, and aft rotatable disks for guiding the upper and lower diverter aft ends between joined and spaced apart location; the disks being located at the upright sidewalls in a generally coplanar relation.

11. The nozzle according to claim 10, wherein the disks are rotated by a number of actuators.

12. The nozzle according to claim 1, wherein the upper and lower diverters are capable of assuming convex and concave shapes.

13. The nozzle according to claim 1, wherein the upper and lower diverters each include multiple subsections pivotably attached end-to-end about axes oriented transverse to the upright sidewalls.

14. The nozzle according to claim 13, wherein the upper and lower diverters each include first, second, and third subsections pivotably attached end-to-end about axes oriented transverse to the upright sidewalls, the first subsection forward end forming said diverter forward end, the third subsection aft end forming said diverter aft end.

15. The nozzle according to claim 13, wherein the actuation assembly includes forward rotatable disks for moving the diverter forward ends between joined and separated positions, and aft rotatable disks for moving diverter aft ends between joined and separated positions; the disks being positioned at the upright sidewalls in a generally coplanar relation.

16. The nozzle according to claim 13, wherein the disks are rotated by a number of actuators.

17. An ejector nozzle attached to an exhaust region of a turbofan or turbojet engine, the nozzle for optimizing engine performance and suppressing engine noise, the nozzle comprising:
   (a) upper and lower cowlings each including at least one ejector for directing ambient air into the nozzle and at least one mixing component for encouraging the mixing of the ambient air with the nozzle exhaust airflow;
   (b) a reconfigurable plug assembly extending between upright nozzle sidewalls, the upper and lower cowlings being located above and below the plug assembly respectively, the plug assembly including separable upper and lower diverters each having an inner surface, an outer surface, a forward end, and an aft end, the upper and lower diverters being positioned in an opposed relation, the reconfigurable plug assembly having a first configuration that includes having the diverter forward ends positioned together and the diverter aft ends positioned together to allow exhaust to pass around the diverter outer surfaces and a second configuration that includes having the diverter forward ends positioned apart and the diverter aft ends positioned apart to allow exhaust to pass between the upper and lower diverter inner surfaces
   (c) an actuation assembly for moving the diverters between the at least two distinct configurations.

18. The nozzle according to claim 17, wherein the plug assembly second configuration includes positioning the upper and lower diverter forward ends adjacent the upper and lower cowling inner surfaces respectively, to cause the ejectors to be entirely covered from the exhaust airflow.

19. The nozzle according to claim 17, wherein the upper and lower diverters each include multiple subsections pivotably attached end-to-end about axes extending between the upright sidewalls.

20. The nozzle according to claim 17, wherein the actuation assembly comprises a number of rotatable disks for positioning the upper and lower diverters between their at least two configurations, the disks being positioned at the upright sidewalls in a coplanar relation, the disks being rotated by a number of actuators.

21. The nozzle according to claim 17, wherein the upper and lower ejectors are stationary lobed mixer ejectors.

22. The nozzle according to claim 17, further including upper and lower aft flaps, each aft flap having a forward end and an aft end, the aft flap forward ends being pivotable about axes of rotation extending between the sidewalls at locations aft of the cowling ejectors.

23. The nozzle according to claim 22, wherein the plug assembly further includes acoustic lining attached to the upper and lower diverter outer surfaces and upper and lower aft flaps surfaces.

* * * * *

UNITED STATES PATENT AND TRADEMARK OFFICE
CERTIFICATE OF CORRECTION

PATENT NO. : 5,779,150
DATED : July 14, 1998
INVENTOR(S) : G.L. Lidstone et al.

It is certified that error appears in the above-identified patent and that said Letters Patent is hereby corrected as shown below:

| COLUMN | LINE | |
|---|---|---|
| Title page, item [56] | Refs. Cited (U.S. Pats., Item 11) | "3,613,829" should read --3,613,826-- |
| Title page, item [56], | Refs. Cited (U.S. Pats., Item 19) | "4,165,607" should read --4,165,609-- |
| 10 (Claim 1, | 20 line 4) | after "between" delete "an" |
| 10 (Claim 9, | 67 line 3) | "flaps" should read --flap-- |
| 12 (Claim 17, | 13 line 24) | after "surfaces" insert --; and-- |
| 12 (Claim 23, | 41 line 4) | "flaps" should read --flap-- |

Signed and Sealed this

Sixteenth Day of March, 1999

Attest:

Q. TODD DICKINSON

Attesting Officer

Acting Commissioner of Patents and Trademarks